(12) United States Patent
Matsuda et al.

(10) Patent No.: US 10,421,239 B2
(45) Date of Patent: Sep. 24, 2019

(54) METHOD FOR PRODUCING AN OPTICAL LAMINATE COMPRISING A STRETCHED RESIN FILM AND A POLARIZING FILM USING A DILUTED LYOTROPIC LIQUID CRYSTAL COMPOUND SOLUTION

(71) Applicant: NITTO DENKO CORPORATION, Ibaraki-shi, Osaka (JP)

(72) Inventors: Shoichi Matsuda, Ibaraki (JP); Yoshiaki Asanoi, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/649,608

(22) PCT Filed: Dec. 12, 2013

(86) PCT No.: PCT/JP2013/083389
§ 371 (c)(1),
(2) Date: Jun. 4, 2015

(87) PCT Pub. No.: WO2014/097966
PCT Pub. Date: Jun. 26, 2014

(65) Prior Publication Data
US 2015/0343725 A1    Dec. 3, 2015

(30) Foreign Application Priority Data

Dec. 17, 2012 (JP) ................................ 2012-274846
Dec. 11, 2013 (JP) ................................ 2013-255978

(51) Int. Cl.
*B29D 11/00* (2006.01)
*G02F 1/1335* (2006.01)
(Continued)

(52) U.S. Cl.
CPC .... *B29D 11/00644* (2013.01); *B29D 11/0073* (2013.01); *G02B 5/3016* (2013.01);
(Continued)

(58) Field of Classification Search
CPC .......... B29D 11/00644; B29D 11/0073; B29K 2105/0079; B29K 2023/38; B29K 2995/0034; B29C 55/04; G02B 5/3016
See application file for complete search history.

(56) References Cited

U.S. PATENT DOCUMENTS 6,630,289 B1 * 10/2003 Kwok ................. G02B 5/3016
427/162
2006/0066785 A1 * 3/2006 Moriya ................ G02F 1/1323
349/117
(Continued)

FOREIGN PATENT DOCUMENTS

JP      11-109353 A     4/1999
JP      2005-266323 A   9/2005
(Continued)

OTHER PUBLICATIONS

Notification of Transmittal of Translation of the International Preliminary Report on Patentability (Form PCT/IB/338) issued in counterpart International Application No. PCT/JP2013/083889 dated Jul. 2, 2015, with Forms PCT/IB/373 and PCT/ISA/237 (5 pages).
(Continued)

*Primary Examiner* — Paul C Lee
(74) *Attorney, Agent, or Firm* — Westerman, Hattori, Daniels & Adrian, LLP

(57) ABSTRACT

It is an object of the invention to provide an optical laminate-producing method in which a polarizing film having the desired optical properties can be conveniently formed on a resin film as a substrate without performing any surface alignment treatment such as rubbing on the resin film. The
(Continued)

invention relates to a method for producing an optical laminate comprising a stretched resin film and a polarizing film, the method comprising the steps of: preparing a stretched resin film; applying a solution of a liquid crystal compound in an isotropic phase state to the stretched resin film; and forming a polarizing film in which the liquid crystal compound is aligned by solidifying the applied liquid crystal compound solution, wherein a slow axis of the stretched resin film is substantially parallel to an absorption axis of the polarizing film, and the stretched resin film undergoes no surface alignment treatment.

5 Claims, 1 Drawing Sheet

(51) Int. Cl.
  *G02B 5/30* (2006.01)
  *B29K 105/00* (2006.01)
  *B29K 23/00* (2006.01)
  *B29C 55/04* (2006.01)

(52) U.S. Cl.
  CPC ........ *G02F 1/133528* (2013.01); *B29C 55/04* (2013.01); *B29K 2023/38* (2013.01); *B29K 2105/0079* (2013.01); *B29K 2995/0034* (2013.01)

(56) References Cited

U.S. PATENT DOCUMENTS

| | | | | |
|---|---|---|---|---|
| 2009/0097261 A1* | 4/2009 | Hsieh | ................... | G02B 5/0215 362/355 |
| 2009/0103017 A1* | 4/2009 | Maezawa | .......... | G02F 1/133528 349/96 |
| 2009/0231520 A1 | 9/2009 | Uchiyama et al. | | |
| 2009/0269591 A1* | 10/2009 | Kasianova | ......... | C09K 19/3804 428/435 |
| 2010/0039608 A1 | 2/2010 | Matsuda et al. | | |
| 2010/0067112 A1* | 3/2010 | Iwakawa | ................... | G02B 1/04 359/489.2 |
| 2010/0157195 A1* | 6/2010 | Miyatake | ............. | G02B 5/3033 349/62 |
| 2010/0188605 A1* | 7/2010 | Hasegawa | ............ | G02B 5/3033 349/62 |
| 2012/0249900 A1* | 10/2012 | Koike | ............... | G02F 1/133528 349/15 |
| 2012/0314159 A1* | 12/2012 | Sakai | .................. | G02F 1/13363 349/96 |

FOREIGN PATENT DOCUMENTS

| | | |
|---|---|---|
| JP | 2009-9062 A | 1/2009 |
| JP | 2009-173849 A | 8/2009 |
| JP | 2010-20207 A | 1/2010 |
| TW | 200804880 | 1/2008 |

OTHER PUBLICATIONS

Office Action dated Aug. 12, 2015, issued in counterpart Taiwanese Application No. 102146376, with English translation (10 pages).
Office Action dated Sep. 14, 2017, issued in counterpart Japanese Application No. 2013-255978, with English translation (4 pages).
International Search Report dated Jan. 28, 2014, issued in corresponding application No. PCT/JP2013/083389 (1 page).
Decision of Refusal dated Mar. 27, 2018, issued in counterpart Japanese Application No. 2013-255978, with English machine translation. (4 pages).

* cited by examiner

METHOD FOR PRODUCING AN OPTICAL LAMINATE COMPRISING A STRETCHED RESIN FILM AND A POLARIZING FILM USING A DILUTED LYOTROPIC LIQUID CRYSTAL COMPOUND SOLUTION

TECHNICAL FIELD

The invention relates to a method for producing an optical laminate including a stretched resin film and a polarizing film formed thereon and also to an optical laminate.

BACKGROUND ART

There are known various multilayer polarizing plates each including a substrate such as a retardation film and a polarizing film formed thereon. Known methods for producing such polarizing plates include, for example, providing a substrate having undergone a surface alignment treatment such as rubbing or a substrate having an alignment film and applying a liquid crystal compound-containing coating liquid to the substrate to form a liquid crystal alignment layer (see, for example, Patent Documents 1 and 2).

There is also known a polarizing plate-producing method that includes providing an alignment substrate having an alignment axis, applying, to the substrate, a solution containing a thermotropic liquid crystal polymer and a dichroic dye, and heating the liquid crystal polymer to a liquid crystal transition temperature or higher to form a polarizer (see, for example, Patent Document 3).

PRIOR ART DOCUMENTS

Patent Documents

Patent Document 1: JP-A-2009-173849
Patent Document 2: JP-A-2010-020207
Patent Document 3: JP-A-2009-009062

SUMMARY OF THE INVENTION

Problems to be Solved by the Invention

The above method of forming a polarizing film by applying a coating liquid containing a liquid crystal compound is attracting attention because it does not need any stretching process for forming the polarizing film and can form a thinner polarizing film. However, the production method described in Patent Documents 1 and 2 needs to perform a surface alignment treatment on a substrate, and such a surface alignment treatment requires a large treatment facility. Thus, there has been a demand for a method capable of forming a polarizing film with the desired optical properties without performing such a treatment.

In addition, the surface alignment treatment can scratch the substrate surface and cause deposition of a contaminant. Fine surface defects are more likely to occur at the scratched portion and the portion where a contaminant is deposited. If a polarizing film is formed on the substrate having such defects, there can be a problem in that local disturbances of alignment are more likely to occur. Particularly when a rubbing treatment such as rubbing with a fiber cloth is performed, contaminants such as fiber debris are more likely to be deposited on the substrate surface, and the problem will be significant.

In the production method described in Patent Document 3, a shear force is applied during the application of a liquid crystal compound in a liquid crystalline state and inevitably affects the aligned state, so that the alignment is difficult to control in the direction where the substrate has been stretched, and such a shear force may cause an alignment failure. It is conceivable that if the direction of the application is so controlled that the direction of the shear force completely coincides with the direction in which the substrate has been stretched, the liquid crystal compound can be ideally aligned in the direction where the substrate has been stretched. However, particularly in the application process performed on a long film, it is very difficult to control the direction of the application to the film because the film is continuously fed in the longitudinal direction.

It is an object of the invention to provide an optical laminate-producing method in which a polarizing film having the desired optical properties can be conveniently formed on a resin film as a substrate without performing any surface alignment treatment such as rubbing on the resin film.

Means for Solving the Problems

As a result of diligent studies in view of the above problems, the production method described below has been found to enable the solution of the conventional problems.

The invention relates to a method for producing an optical laminate comprising a stretched resin film and a polarizing film, the method comprising the steps of:

preparing a stretched resin film;

applying a solution of a liquid crystal compound in an isotropic phase state to the stretched resin film; and forming a polarizing film in which the liquid crystal compound is aligned by solidifying the applied liquid crystal compound solution, wherein a slow axis of the stretched resin film is substantially parallel to an absorption axis of the polarizing film, and the stretched resin film undergoes no surface alignment treatment.

In the method of the invention, the resin film preferably has an in-plane birefringence of 0.0005 or more at a wavelength of 590 nm.

In the method of the invention, the solution of the liquid crystal compound in an isotropic phase state is preferably a diluted lyotropic liquid crystal compound solution with a concentration lower than an isotropic-liquid crystal phase transition concentration.

In the method of the invention, the polarizing film preferably has a degree of polarization of 10% or more.

The invention also relates to an optical laminate, comprising:

a stretched resin film; and a polarizing film formed by application directly on the stretched resin film, wherein a surface of the stretched resin film has undergone no surface alignment treatment, and a slow axis of the stretched resin film is substantially parallel to an absorption axis of the polarizing film.

Effect of the Invention

In the invention, a solution of a liquid crystal compound in an isotropic phase state is applied to a stretched resin film having undergone no surface alignment treatment, so that even without any surface alignment treatment such as rubbing on the substrate, the liquid crystal compound can be aligned substantially parallel to the direction in which the resin film has been stretched. In the invention, the stretched resin film undergoes no surface alignment treatment. Therefore, surface defects are less likely to occur on the stretched resin film, so that the alignment in the polarizing film formed on the stretched resin film can be prevented from being locally disturbed.

MODE FOR CARRYING OUT THE INVENTION

1. Method for Producing Optical Laminate

Figure 1:
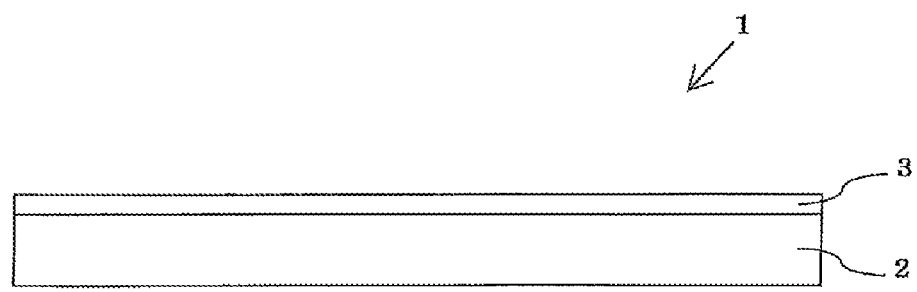
FIG. 1 is a cross-sectional view schematically showing an embodiment of the optical laminate of the invention.

The invention is directed to a method for producing an optical laminate including a stretched resin film (hereinafter also referred to as "a stretched resin film") and a polarizing film, the method including the steps of:

preparing a stretched resin film (step 1);

applying a solution of a liquid crystal compound in an isotropic phase state to the stretched resin film (step 2); and forming a polarizing film in which the liquid crystal compound is aligned by solidifying the applied liquid crystal compound solution (step 3), wherein the slow axis of the stretched resin film is substantially parallel to the absorption axis of the polarizing film, and the stretched resin film undergoes no surface alignment treatment.

(1) Step 1

The step 1 includes preparing a stretched resin film. The stretched resin film is obtained by stretching a resin film.

The resin film used in the invention may be, for example, but not limited to, a cycloolefin resin film, a cellulose resin film, an acrylic resin film, a polycarbonate resin film, a polyester resin film, or the like. In particular, a cycloolefin resin film is preferred, and a norbornene resin film is more preferred.

For example, the thickness of the resin film is preferably, but not limited to, 20 to 200 µm. After the stretching, the thickness of the resin film is preferably, for example, 10 to 150 lam, although it depends on the thickness of the resin film before the stretching, the stretching method, the stretch ratio, and so on.

The stretching method may be uniaxial stretching, simultaneous biaxial stretching, sequential biaxial stretching, or the like. Any suitable stretching machines such as roll stretching, tenter stretching, and biaxial stretching machines may be used as the stretching means. In the invention, the stretched resin film is preferably a retardation film. Therefore, the stretching method is preferably uniaxial stretching or biaxial stretching in which the stretch ratio in the lengthwise direction differs from that in the transverse direction, and uniaxial stretching is more preferred. When the resin film is a long resin film, the stretching method is typically a method of uniaxially stretching the long resin film in the longitudinal direction (or in the transverse direction perpendicular thereto) so that a slow axis can be formed in the longitudinal direction (the long side direction of the film).

The stretch ratio may be appropriately selected depending on the type of the material of the film used, the desired Nz coefficient, or the like. For example, the resin film is preferably stretched to about 1.01 to about 5 times, more preferably about 1.1 to about 5 times the original length of the unstretched resin film. For example, the stretching temperature is preferably, but not limited to, 80 to 200° C.

The resin film that is treated by stretching process (the stretched resin film) preferably has an in-plane birefringence ($\Delta n = nx - ny$) of 0.0005 or more, more preferably 0.0005 to 0.5, even more preferably 0.0005 to 0.3 at a wavelength of 590 nm. In view of the stretching process controllability and the liquid crystal compound alignment, the in-plane birefringence is preferably from 0.001 to 0.1, more preferably from 0.001 to 0.05. When the in-plane birefringence falls within these ranges, the liquid crystal compound applied on the stretched resin film can be advantageously aligned substantially parallel to the direction in which the resin film has been stretched (the liquid crystal compound will be described later). Here, nx and ny are refractive indexes in x and y directions, respectively, wherein x represents a direction in which the refractive index is the maximum in the xy plane, and y represents a direction perpendicular thereto.

The resin film that is treated by stretching process preferably has an in-plane retardation $\{(nx-ny) \times thickness\}$ of, for example, 10 to 2,000 nm, more preferably 10 to 1,000 nm, although it may be set as appropriate. The Nz coefficient ($Nz = (nx-nz)/(nx-ny)$), which indicates the relationship between the birefringence (nx−nz) in the thickness direction and the in-plane birefringence (nx−ny) is preferably at least 0, more preferably 0 to 10, even more preferably 0.1 to 8. In view of the stretching process controllability and the liquid crystal compound alignment, the Nz coefficient is preferably 1.5 or less, more preferably 0 to 1.2, even more preferably 0.3 to 1.2. Here, nz is the refractive index in the thickness direction.

The Nz coefficient can be appropriately controlled by controlling the stretch ratio in the lengthwise direction (longitudinal direction) and the stretch ratio in the transverse direction (widthwise direction) when the resin film is stretched. For example, the Nz coefficient can be increased by increasing the stretch ratio in the transverse direction while stretching in the lengthwise direction, and the Nz coefficient can be decreased by decreasing the stretch ratio in the transverse direction while stretching in the lengthwise direction or by shrinking in the transverse direction while stretching in the lengthwise direction.

The stretched resin film used in the invention undergoes no surface alignment treatment. The above specific stretched resin film having undergone no surface alignment treatment is used as a substrate to which the liquid crystal compound solution described below is to be applied. Therefore, without any surface alignment treatment such as rubbing, the liquid crystal compound described below can be aligned substantially parallel to the direction in which the resin film has been stretched. In the invention, the stretched resin film undergoes no surface alignment treatment. Therefore, the stretched resin film is less likely to suffer from surface defects, so that the alignment in the polarizing film formed on the stretched resin film can be prevented from being locally disturbed.

In the production method of the invention, the stretched resin film and the polarizing film described below may be laminated together without any adhesive layer interposed therebetween. In order to increase the adhesion between the stretched resin film and the polarizing film, however, the stretched resin film may be subjected to a surface treatment such as a corona treatment or a hydrophilization treatment, and an adhesion-facilitating layer such as a polyurethane resin layer may also be formed with a thickness of about several microns on the surface of the stretched resin film, where the polarizing film is to be formed.

(2) Step 2

The step 2 includes applying a solution of a liquid crystal compound in an isotropic phase state to the stretched resin film.

The liquid crystal compound may be a lyotropic or thermotropic liquid crystal compound. Preferably, the liquid crystal compound is a lyotropic liquid crystal compound. As used herein, the term "lyotropic liquid crystal compound" refers to a liquid crystal compound that can be dissolved in a solvent to form a liquid crystal compound solution and can undergo a phase transition from an isotropic phase to a liquid crystalline phase (or vice versa) as the concentration of its solution changes. In this context, the concentration at which the non-liquid-crystalline state (isotropic phase) changes to the liquid crystalline state (liquid crystalline phase) is referred to as the "isotropic-phase-to-liquid-crystalline-phase transition concentration." As used herein, the term "thermotropic liquid crystal compound" refers to a liquid crystal compound that can thermally undergo a phase transition from an isotropic phase to a liquid crystalline phase (or vice versa). In this context, the temperature at which the non-liquid-crystalline state (isotropic phase) changes to the liquid crystalline state (liquid crystalline phase) is referred to as the "isotropic-phase-to-liquid-crystalline-phase transition temperature."

In the invention, therefore, the "liquid crystal compound solution in an isotropic phase state" may be specifically a liquid crystal compound solution diluted to a concentration lower than the isotropic-phase-to-liquid-crystalline-phase transition concentration or may be specifically a liquid crystal compound solution having a temperature higher than the isotropic-phase-to-liquid-crystalline-phase transition temperature and not being liquid crystalline (or being in an isotropic phase).

The lyotropic liquid crystal compound solution for use in the invention usually contains a lyotropic liquid crystal compound and a solvent in which the lyotropic liquid crystal compound is soluble. For example, the lyotropic liquid crystal compound may be an azo compound, an anthraquinone compound, a perylene compound, a quinophthalone compound, a naphthoquinone compound, a melocyanine compound, or the like. In particular, an azo compound is preferred.

These liquid crystal compounds exhibit dichroism by themselves. Any of these liquid crystal compounds may also be used in combination with a non-dichroic liquid crystal compound. Two or more liquid crystal compounds may also be used together for the purpose of adjusting the color tone or other purposes.

For example, the azo compound may be an azo compound represented by the following general formula (1).

[Formula (1)]

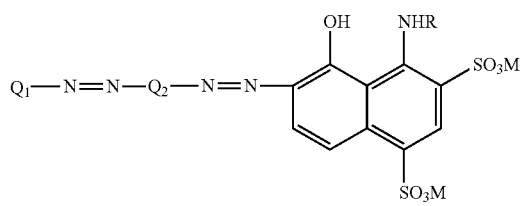

(1)

In formula (1), $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group (these groups may have any substituent groups); and M is a counter ion.

M is a counter ion and is preferably a hydrogen atom, an alkali metal atom, an alkali earth metal atom, a metal ion or a substituted or unsubstituted ammonium ion thereof. Examples of a metal ion include, for example, $Li^+$, $Na^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, or $Ce^{3+}$ and the like. When the counter ion M is a multivalent ion, a plurality of azo compounds share one multivalent ion (counter ion).

The azo compound is preferably represented by the following general formula (2). In the formula (2), R and M are the same as those in the formula (1). X is a hydrogen atom, a halogen atom, a nitro group, a cyano croup, an alkyl group having 1 to 4 carbon atoms, an alkoxy group having 1 to 4 carbon atoms, or —$SO_3M$ group.

[Formula (2)]

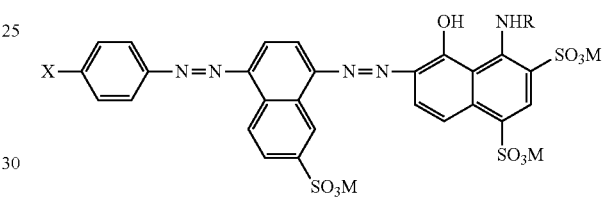

(2)

For example, the azo compound can be produced by the method described in JP-A-2009-173849.

The solvent may be of any type capable of dissolving the lyotropic liquid crystal compound. Preferably, the solvent is a hydrophilic solvent. Examples of the hydrophilic solvent include water, alcohols, cellosolves, and any mixture thereof. In particular, water is preferred. The solvent may also contain a water-soluble compound such as glycerin or ethylene glycol.

The concentration of the lyotropic liquid crystal compound solution is lower than the isotropic-phase-to-liquid-crystalline-phase transition concentration. In other words, the lyotropic liquid crystal compound solution is in a non-liquid-crystalline state (isotropic phase). When such a lyotropic liquid crystal compound solution is used, the liquid crystal compound can be easily aligned parallel or perpendicular to the direction in which the resin film has been stretched without being influenced by the shear stress during the coating process.

The concentration of the lyotropic liquid crystal compound solution may be at any level lower than the isotropic-phase-to-liquid-crystalline-phase transition concentration without limitation. In general, the concentration of the lyotropic liquid crystal compound solution is preferably from 1 to 10% by weight based on the total weight of the solution. The lyotropic liquid crystal compound solution may be applied by any method capable of forming a uniform coating. For example, the solution may be applied using a wire bar, a gap coater, a comma coater, a gravure coater, a tension web coater, a slot die coater, or the like. The application may be performed at room temperature (about 23° C.) although the temperature during the application is not limited. There is no limitation on the direction in which the application is performed. The direction in which the application is performed may be, but not limited to, parallel or perpendicular to the direction in which the resin film has been stretched.

Shear may also be applied during the application. In the invention, however, the liquid crystal compound can be sufficiently aligned even when no shear is applied.

The thermotropic liquid crystal compound solution for use in the invention usually contains a thermotropic liquid crystal compound and a solvent in which the thermotropic liquid crystal compound is soluble. The solvent and applying method of the thermotropic liquid crystal compound solution are same as those of the lyotropic liquid crystal compound solution.

In addition to the liquid crystal compound and the solvent, the liquid crystal compound solution used in the invention may also contain a polymer compound, a metal scavenger, or other materials as long as the effects of the invention are not impaired.

Examples of the polymer compound include those disclosed in JP-A-2009-263453. Examples of the metal scavenger include the compounds disclosed in JP-A-2010-66616.

(3) Step 3

The step 3 includes forming a polarizing film in which the liquid crystal compound is aligned by solidifying the applied liquid crystal compound solution.

The term "solidifying" means that the solvent is evaporated to such an extent that the alignment of the liquid crystal compound is fixed in the applied liquid crystal compound solution. Specifically, when the liquid crystal compound solution is a lyotropic liquid crystal compound solution, the isotropic phase is converted to the liquid crystal phase by changing the concentration of the solution, so that the liquid crystal molecules are aligned to form a polarizing film. Methods for changing the concentration of the solution include, but are not limited to, a method of allowing the solvent to evaporate spontaneously and a method of evaporating the solvent by heating.

When the liquid crystal compound solution is a thermotropic liquid crystal solution, the isotropic phase is converted to the liquid crystal phase by changing the temperature, so that the liquid crystal molecules are aligned to form a polarizing film. The temperature for the phase transition may be appropriately selected depending on the type of the liquid crystal compound used.

(4) Direction in which the Liquid Crystal Compound is Aligned

The direction in which the liquid crystal compound is aligned will be described with reference to FIG. 2. It will be understood that FIG. 2 shows one embodiment of the invention and is not intended to limit the invention.

In the optical laminate obtained by the production method of the invention, the absorption axis 6 of the polarizing film (the direction in which the liquid crystal molecules are aligned) is substantially parallel to the direction 4 of the slow axis of the stretched resin film 2 (the direction in which the resin film has been stretched). In FIG. 2, the absorption axis 6 of the polarizing film is in the direction of the long axis of the liquid crystal compound molecules. In this case, the term "substantially parallel" means that the angle between the direction 4 of the slow axis of the stretched resin film 2 and the absorption axis 6 of the polarizing film is about 0°±5°.

Figure 2:
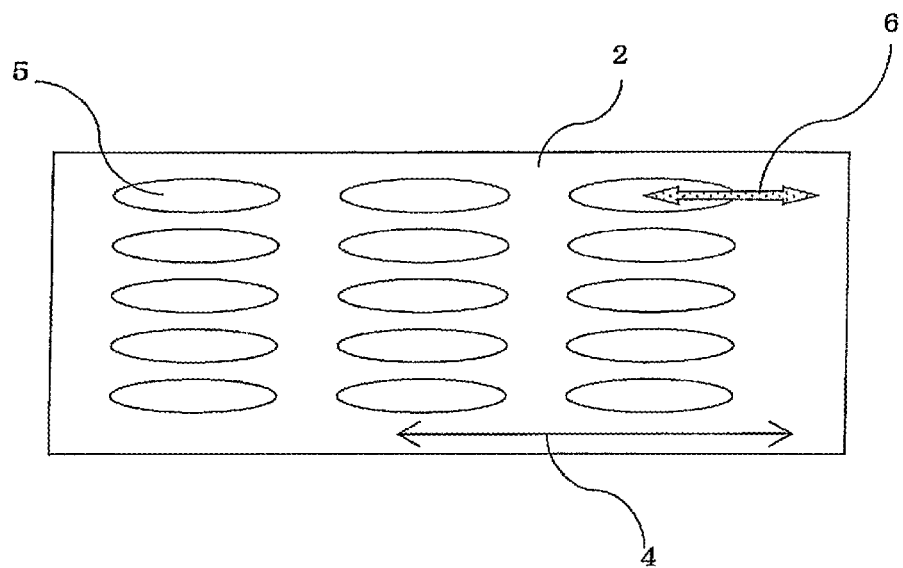
FIG. 2 is a plan view schematically showing an embodiment of the optical laminate of the invention.

FIG. 2 schematically shows a case where the direction 4 of the slow axis of the stretched resin film 2 is aligned substantially parallel to the absorption axis 6 of the polarizing film. Alternatively, depending on the type of the liquid crystal compound 5, the direction of the long axis (absorption axis) of the molecules may be aligned substantially perpendicular to the direction in which the film has been stretched (slow axis). In this case, the direction of the short axis (the direction of the transmission axis) of the molecules is aligned substantially parallel to the direction in which the film has been stretched (slow axis). In this case, the term "substantially parallel" means that the angle between the direction of the short axis and the direction in which the film has been stretched (slow axis) is about 0°±5°.

The concentration of the liquid crystal compound in the formed polarizing film is preferably from 80 to 100% by weight based on the total weight of the polarizing film. The thickness of the polarizing film is preferably from 0.1 to 10 μm, more preferably from 0.1 to 5 μm.

The formed polarizing film exhibits absorption dichroism at any wavelength in the visible light region and has an absorption axis in one in-plane direction. The absorption dichroism is achieved by the alignment of the liquid crystal compound in the polarizing film. The direction of the absorption or transmission axis of the polarizing film is substantially parallel to the longitudinal direction of the stretched resin film (the direction of the long side of the film along the longitudinal direction). The term "substantially parallel" has the same meaning as described above.

(5) Polarizing Film

The polarizing film formed by the production method of the invention preferably has a degree of polarization of 10% or more, more preferably 50% or more, even more preferably 90% or more. The degree of polarization can be measured by the method described in the examples.

2. Optical Laminate

As shown in FIGS. 1 and 2, the optical laminate 1 of the invention includes the stretched resin film 2 and the polarizing film 3 formed by direct application on the stretched resin film 2, wherein the surface of the stretched resin film 2 has undergone no surface alignment treatment, and the slow axis 4 of the stretched resin film 2 is substantially parallel to the absorption axis 6 of the polarizing film.

The term "formed by application directly on" means that the polarizing film is formed directly on the resin film with no adhesive. It should be noted that, however, the adhesion-facilitating layer or the like mentioned above may be provided between the resin film and the polarizing film.

The optical laminate of the invention is preferably produced by the above production method of the invention although the method for producing the optical laminate of the invention is not limited. The materials, the thickness, and other features of the resin film and the polarizing film may be those described above. The term "substantially parallel" also has the same meaning as described above.

3. Applications

The optical laminate obtained according to the invention may be used in, for example, liquid crystal displays, organic EL displays, and so on.

EXAMPLES

Hereinafter, the invention is described with reference to the examples below, which however are not intended to limit the invention.

<Measurement Methods>

In each of the examples and the comparative examples described below, the measurement methods described below were used for determination and evaluation.

(1) Measurement of Thickness

The thickness was measured using a digital gauge (PEACOCK (product name) manufactured by OZAKI MFG. CO., LTD.).

(2) Measurement of Single Transmittance and Degree of Polarization

The polarized transmission spectra $k_1$ and $k_2$ were measured using a spectrophotometer (V-7100 (product name) manufactured by JASCO Corporation). The spectrum $k_1$ is a transmission spectrum obtained when polarized light having an electric field vector parallel to the transmission axis of the polarizing film is incident on the polarizing film, and the spectrum $k_2$ is a transmission spectrum obtained when polarized light having an electric field vector perpendicular to the transmission axis of the polarizing film is incident on the polarizing film. The measurement wavelength ranged from 380 to 780 nm. Using this spectra, the transmittance $Y_1$ (the linearly-polarized light transmittance in the maximum transmittance direction) and the transmittance $Y_2$ (the transmittance in the direction perpendicular to the maximum transmittance direction) were obtained through color correction. The single transmittance and the degree of polarization were then calculated from the following formulae.

Single transmittance=$(Y_1+Y_2)/2$

Degree of polarization=$(Y_1-Y_2)/(Y_1+Y_2)$ (3) Method for Measuring the Angle Between the Absorption Axis of the Polarizing Film and the Slow Axis of the Stretched Resin Film The angle was measured at 23° C. using KOBRA-WPR (trade name) manufactured by Oji Scientific Instruments. The measurement was performed at a wavelength of 590 nm.

Production Example 1 (Preparation of Aqueous Lyotropic Liquid Crystal Solution in Liquid Crystalline Phase State)

In accordance with a conventional method ("Riron Seizo Senryo Kagaku (Theoretical production Dye Chemistry)" Fifth Edition, Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to diazotization and coupling reaction with 1-amino-8-naphthol-2,4-disulfonate lithium salt. An obtained rough product including an azo compound having the following structural formula (3) was salted out with lithium chloride to obtain the azo compound having the following structural formula (3).

[Formula (3)]

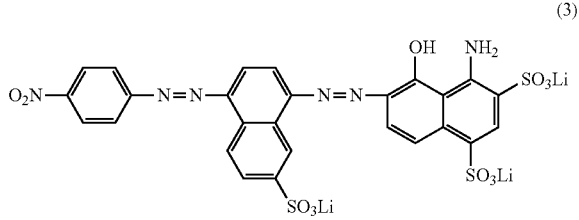

(3)

The azo compound of structural formula (3) above was dissolved in ion-exchanged water to form an aqueous 20% by weight solution (coating liquid 1). The aqueous solution was sampled with a plastic syringe and then placed between two glass slides. The sample was then observed at room temperature (23° C.) with a polarizing microscope. As a result, a nematic liquid crystal phase was observed.

Production Example 2 (Preparation of Aqueous Solution of Lyotropic Liquid Crystal in Isotropic Phase State)

The azo compound of structural formula (3) above was dissolved in ion-exchanged water to form an aqueous 8% by weight solution (coating liquid 2). The aqueous solution was sampled with a plastic syringe and then placed between two glass slides. The sample was then observed at room temperature (23° C.) with a polarizing microscope. As a result, no nematic liquid crystal phase was observed, but an isotropic phase was observed.

Example 1 (Batch Process)

A norbornene resin film (trade name: ZEONOR (registered trademark), thickness: 100 μm, manufactured by Zeon Corporation) was used. The film was uniaxially stretched (stretch ratio: 1.2 times, temperature: 145° C.) to form a stretched resin film with an in-plane birefringence of 0.00094 (λ=590 nm) (thickness: 90 μm). The resulting stretched resin film had an in-plane retardation of 84 nm and an Nz coefficient of 1.35.

The stretched resin film was subjected to a corona treatment for surface hydrophilization without being subjected to any surface alignment treatment such as rubbing or photoalignment treatment. Subsequently, coating liquid 2 prepared in Production Example 2 was applied to the stretched resin film with a bar coater (product name: Mayer rot HS3, manufactured by BUSHMAN) (application temperature: 23° C.), in which coating liquid 2 was applied in the direction where the resin film had been stretched. The product was air-dried in a thermostatic chamber at 23° C. to give a polarizing plate including the stretched resin film and a polarizing film (thickness: 0.2 μm) formed thereon.

The polarizing plate had the following polarization characteristics: a single transmittance of 39.4%, a degree of polarization of 98.9%, and an angle of 0.1° between the absorption axis of the polarizing film (the direction of the long axis of the liquid crystal compound molecules) and the slow axis of the stretched resin film (the direction of the stretching).

Example 2

A polarizing plate was prepared using the same process as in Example 1, except that coating liquid 2 was applied in a direction perpendicular to the direction in which the resin film had been stretched.

The polarizing plate had the following polarization characteristics: a single transmittance of 39.6%, a degree of polarization of 98.5%, and an angle of 0.1° between the absorption axis of the polarizing film and the slow axis of the stretched resin film.

Example 3

A polarizing plate was prepared using the same process as in Example 1, except that the resin film was so stretched as to form a stretched resin film with an in-plane birefringence of 0.00176 (λ=590 nm). The resulting stretched resin film had a thickness of 81 μm, an in-plane retardation of 142 nm, and an Nz coefficient of 1.31.

The polarizing plate had the following polarization characteristics: a single transmittance of 39.7%, a degree of polarization of 98.4%, and an angle of 0.0° between the absorption axis of the polarizing film and the slow axis of the stretched resin film.

Example 4

A polarizing plate was prepared using the same process as in Example 3, except that coating liquid 2 was applied in a direction perpendicular to the direction in which the resin film had been stretched.

The polarizing plate had the following polarization characteristics: a single transmittance of 39.5%, a degree of polarization of 98.7%, and an angle of 0.3° between the absorption axis of the polarizing film and the slow axis of the stretched resin film.

Example 5

A polarizing plate was prepared using the same process as in Example 1, except that the resin film was so stretched as to form a stretched resin film with an in-plane birefringence of 0.00263 (λ=590 nm). The resulting stretched resin film had a thickness of 71 μm, an in-plane retardation of 187 nm, and an Nz coefficient of 1.27.

The polarizing plate had the following polarization characteristics: a single transmittance of 39.7%, a degree of polarization of 98.6%, and an angle of 0.4° between the absorption axis of the polarizing film and the slow axis of the stretched resin film.

Example 6

A polarizing plate was prepared using the same process as in Example 5, except that coating liquid 2 was applied in a direction perpendicular to the direction in which the resin film had been stretched.

The polarizing plate had the following polarization characteristics: a single transmittance of 39.8%, a degree of polarization of 98.4%, and an angle of 0.2° between the absorption axis of the polarizing film and the slow axis of the stretched resin film.

Example 7

A polarizing plate was prepared using the same process as in Example 1, except that the resin film was so stretched as to form a stretched resin film with an in-plane birefringence of 0.00361 (λ=590 nm). The resulting stretched resin film had a thickness of 61 μm, an in-plane retardation of 220 nm, and an Nz coefficient of 1.18.

The polarizing plate had the following polarization characteristics: a single transmittance of 40.1%, a degree of polarization of 98.7%, and an angle of 0.2° between the absorption axis of the polarizing film and the slow axis of the stretched resin film.

Example 8

A polarizing plate was prepared using the same process as in Example 7, except that coating liquid 2 was applied in a direction perpendicular to the direction in which the resin film had been stretched.

The polarizing plate had the following polarization characteristics: a single transmittance of 39.9%, a degree of polarization of 98.7%, and an angle of 0.1° between the absorption axis of the polarizing film and the slow axis of the stretched resin film.

Comparative Example 1

A polarizing plate was prepared using the same process as in Example 1, except that the resin film was not stretched (non-stretched resin film, in-plane birefringence: 0.000).

The polarizing plate had the following polarization characteristics: a single transmittance of 39.8% and a degree of polarization of 0.0%, and did not function as a polarizing plate.

Comparative Example 2

A polarizing plate was prepared using the same process as in Example 7, except that the bar coater used was Mayer rot HS1.5 manufactured by BUSHMAN and that coating liquid 1 prepared in Production Example 1 was used instead.

The polarizing plate had the following polarization characteristics: a single transmittance of 35.3% and a degree of polarization of 2.6%, and did not function as a polarizing plate.

DESCRIPTION OF REFERENCE SIGNS

In the drawings, reference sign 1 represents an optical laminate, 2 a stretched resin film (stretched resin film), 3 a polarizing film, 4 the direction of the slow axis of a stretched resin film (the direction in which stretching has been performed), 5 a liquid crystal compound, and 6 the absorption axis of a polarizing film (the direction of the long axis of the liquid crystal compound molecules).

The invention claimed is:

1. A method for producing an optical laminate comprising a stretched resin film and a polarizing film, the method comprising the steps of:
   preparing a stretched resin film;
   applying a solution of a liquid crystal compound in an isotropic phase state to the stretched resin film; and
   forming a polarizing film in which the liquid crystal compound is aligned by solidifying the applied liquid crystal compound solution, wherein
   a slow axis of the stretched resin film is substantially parallel to an absorption axis of the polarizing film,
   the stretched resin film undergoes no surface alignment treatment,
   wherein the resin film has an in-plane birefringence of 0.001 or more to 0.1 or less at a wavelength of 590 nm,
   wherein the solution of the liquid crystal compound in an isotropic phase state is a diluted lyotropic liquid crystal compound solution with a concentration lower than an isotropic-liquid crystal phase transition concentration, and
   wherein the lyotropic liquid crystal compound is an azo compound.

2. The method according to claim 1, wherein the polarizing film has a degree of polarization of 10% or more.

3. The method according to claim 1, wherein the polarizing film has a degree of polarization of 10% or more.

4. The method according to claim1, wherein the polarizing film has a degree of polarization of 10% or more.

5. The method according to claim 1, wherein the concentration of the lyotropic liquid crystal compound solution is 1 to 10% by weight based on the total weight of the solution.

\* \* \* \* \*